Dec. 15, 1931.  N. L. BIGTON ET AL  1,836,007
MACHINE FOR MOLDING PLASTIC MATERIAL
Filed Dec. 3, 1928    4 Sheets-Sheet 1

Fig. 1.

Nicolai Lewis Bigton
and Louis X. Garfunkel
INVENTORS

BY
Morris Fischstein
ATTORNEY

Dec. 15, 1931.  N. L. BIGTON ET AL  1,836,007
MACHINE FOR MOLDING PLASTIC MATERIAL
Filed Dec. 3, 1928  4 Sheets-Sheet 4

Patented Dec. 15, 1931

1,836,007

UNITED STATES PATENT OFFICE

NICOLAI LEWIS BIGTON, OF CAMDEN, NEW JERSEY, AND LOUIS X. GARFUNKEL, OF NEW YORK, N. Y., ASSIGNORS TO AUTOMATIC HAMBURGER MACHINE COMPANY, INC., A CORPORATION OF NEW YORK

MACHINE FOR MOLDING PLASTIC MATERIAL

Application filed December 3, 1928. Serial No. 323,244.

This invention relates to machines for plastic material. More particularly it relates to a machine of the type generally described in our co-pending application bearing Serial Number 233,930 and filed November 17, 1927.

Certain features described and claimed in said co-pending application are described but not claimed in the present case.

Among the objects of this invention is to generally improve the construction of machine shown in my said co-pending application, so as to provide a highly practical economical and efficient device of the character and for the purposes described.

A further object of this application is to provide in a machine of the character described improved means for positively removing formed cakes from the molding plate.

Another object of this invention is to provide improved means for spreading cracker crumbs or the like coating material for the molded cakes.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention.

The machine embodying the invention shown on the drawings comprises a base 10 having an integral extension 11 at one end thereof carrying the power device 12. Said power device has coupled connection with the drive device 13. Mounted on said drive device and connected thereto in a manner hereinafter described is the hopper 14.

A fixed support 15 on said base 10 carries the forming plate 16 rotatably associated therewith, said plate having a number of mold openings 17, which are movable into position under the discharge opening 18 of hopper 14. Ejecting discs 20, mounted in openings 17 are actuated by a cam device 21 to eject the formed cakes from said mold openings on to the top of plate 16 from where they are removed by a revolving pin disc device 22. Said pin disc device 22 moves the cake so that it will slide off plate 16 upon a chain belt 23 which conveys the cake to a storage container or the like, or, if desired, may deposit it within a suitable cooking device (not shown). Positioned over plate 16 is a cracker crumb spreader 24, which is so related to hopper 14 that a coating of crumbs will be applied to said plate before it moves under the discharge opening 18. Likewise, a cracker crumb spreader 25, similar to crumb spreader 24, is supported over belt 23 to continuously discharge cracker crumbs thereon, so that any material passing over belt 23 will be properly coated. A scraping mechanism 26 may be provided for continuously cleaning the portion of the plate from which the cakes have been removed, thus preventing accumulations of food material on said plate 16 and discharging discs 20.

The drive device 13 consists of a casing 30, in which is mounted a worm gear 31 fixed to a shaft 32 which extends vertically from said casing at both ends thereof. The worm (not shown) which engages the worm gear 31 is fixed to shaft 34 extending horizontally out of casing 30 and coupled as at 35 to the power device 12, which may be an ordinary electric motor.

Fixed to the upwardly extending portion 40 of said shaft 32 is a gear 41. The base plate 42 of hopper 14 is provided with a hub 42a received on said shaft and supported on said gear, said base being retained against rotary movement in a manner hereinafter described. A depending skirt portion 41a integrally formed with said plate 42 acts as a protective housing for said gear 41. The body 43 of the hopper 14 is suitably mounted in the base plate 42 in any well known manner.

The extreme upper end of the shaft 32 is formed with threads 45, an internally threaded body portion 46 being received on said threads. Said body portion carries a feeding member 47. Said feeding member consists of four, radial propeller shaped blades 48 spaced from the upper surface 49 of said base plate 42. The angle of said blades with respect to a horizontal plane is such that the comminuted material in the hopper will be fed thru the opening 18 and firmly packed into the mold 17.

An agitator blade 50 is secured to the upper end of the body 46, preferably by a set screw 51 extending thru a suitably apertured boss 52 integrally formed with said blade. Said agitator blade is shorter than blades 48 but is also set at an angle to the horizontal plane. Mounted for rotation on the body portion 46 intermediate said boss 52 and the feeding member 47 is a collar 53 from which a stop blade 53a extends radially. Said collar and blade are freely rotatable on said body portion 46, but are restrained against moving past a portion hereinafter described, by a projection 54 secured to the hopper wall 43 in any suitable manner as by screw 55.

The threads 45 are cut in a direction such that, as the blades 48, 50 act upon the material contained in hopper 14, the body portion 46 will tend to become more tightly secured upon the shaft 40. The threads in body portion 46 extend the entire length of the internal passage 56. A stud 57 is received in the upper end portion 58 of said passage 56, said stud being provided with a head 59 and a lock nut 60. When body portion 46 is threaded down over shaft 45, the end of stud 57 is adapted to contact with the upper end of shaft 45. By this last described means, the effective distance between the upper surface 49 of the base plate 42 and the blades 48 may be adjusted in order to control the feeding pressure on material forced down thru said opening 18 in the hopper. The rotating agitator blade 50 tends to prevent formation of air pockets in the material placed in hopper 14. The blade 53a tends to stop movement of the entire mass of viscous, sticky material bodily within the hopper. Projection 54 is preferably so placed as to stop blade 53a at a position so that it is practically tangent to the edge 61 of opening 18 by which the mold openings 17 pass last in their movement past hopper 14. The material being forced around by the feeding member 47 is crowded against blade 53a which assists blades 48 in compressing the material into said mold openings 17.

The fixed support 15 comprises a boss 65 preferably integrally formed with said base 10. A spur shaft 66 mounted within a bore 67 in said boss, is secured thereto against rotary movement by the pin 68. Rotatably received on said shaft 66 and supported on boss 65 is the forming plate 16. The base plate 42 of the hopper is provided with an arcuate extension 69 preferably formed integrally with said plate, and overlying a portion of the forming plate 16. Said extension is formed with an ear member 70, bored at 71 to receive the upper portion 72 of said spur shaft 66. A nut 73 coacting with the extreme threaded end 74 of said shaft retains said base plate 42 against vertical movement. The pressure contact of the lower face 75 of said extension 69 on the forming plate may be regulated by said nut 73 to prevent material in the hopper from squeezing between said plate and extension.

Said forming plate 16 is preferably circular in shape and has formed therethru a number of said openings 17 positioned so that their centers are preferably regularly spaced on a circle concentric with said plate. Across each of said openings extends the rib 76 having a central opening 77 to slidably receive the piston rod 78 secured to said ejecting disc or piston 20. A pin 80 extending thru said piston rod 78 retains a coil spring 81 mounted on said rod, which spring contacts the under surface of said rib 76. A stud 82 threaded through each of said ribs 76 provides an adjustable stop for limiting the downward movement of piston rod 78 effected by the compression springs 81.

Figure 1:
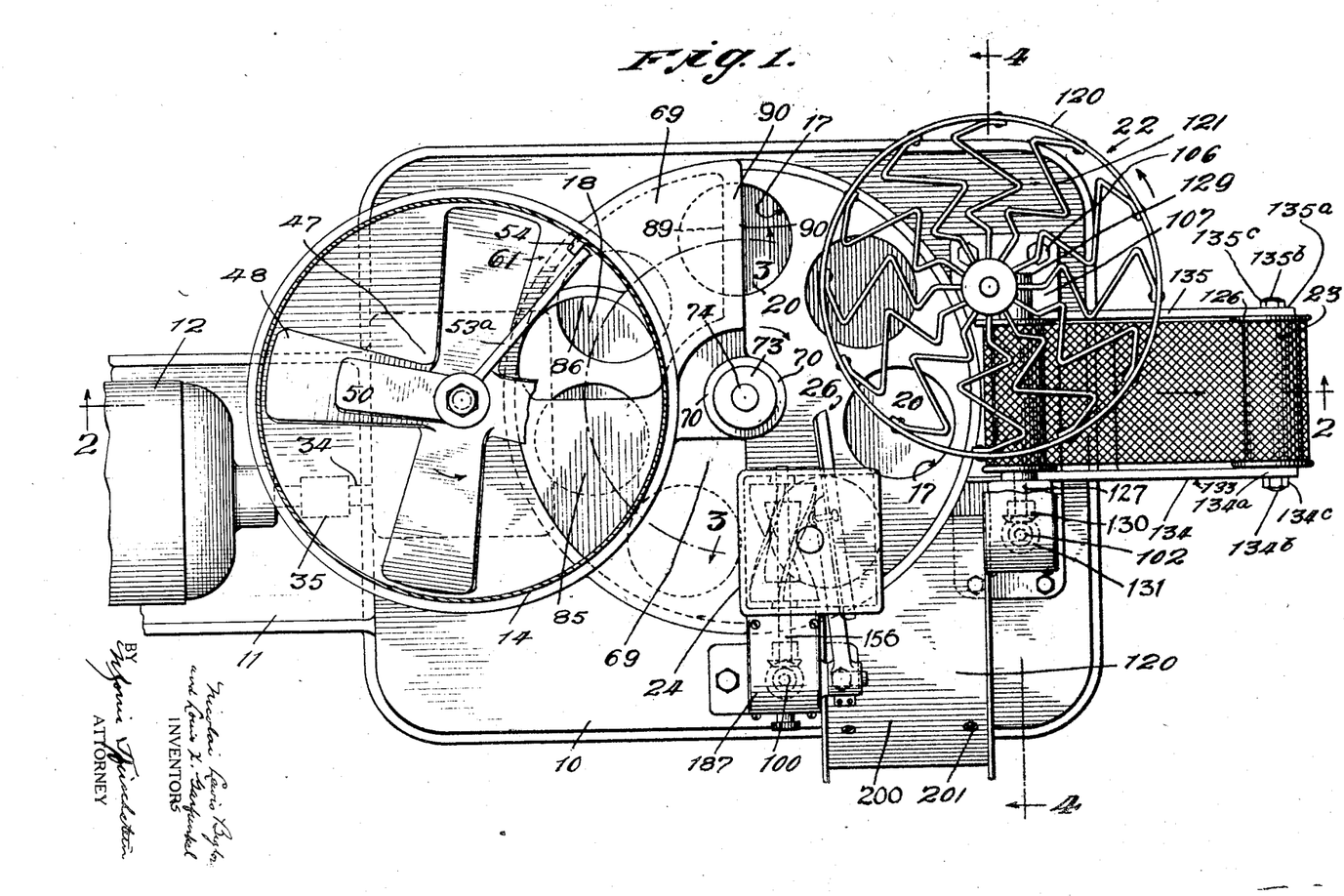
Fig. 1 is a top plan view of the device embodying the invention with parts removed to show features of construction.
Figure 2:
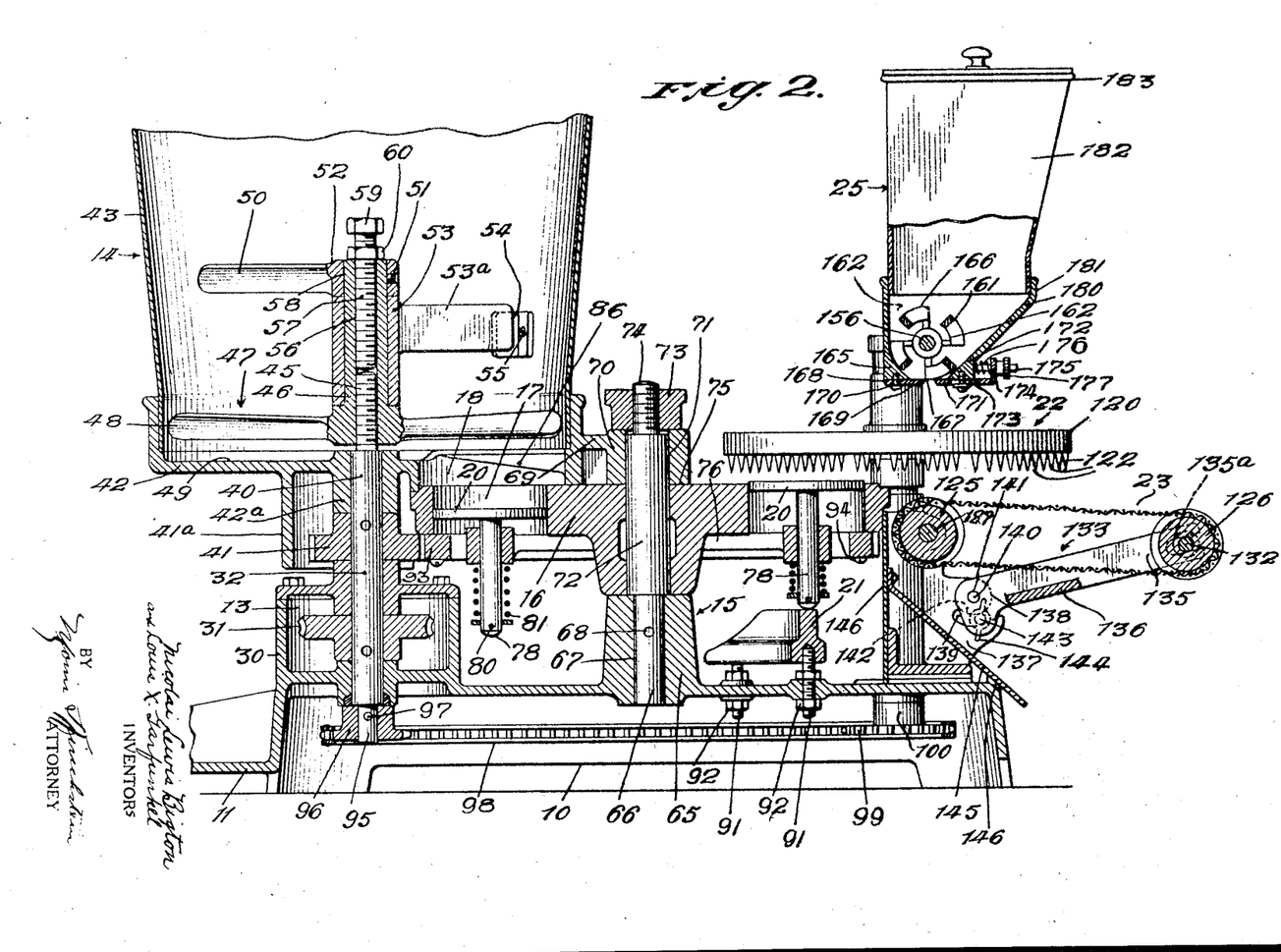
Fig. 2 is a cross-sectional view taken on line 2—2 of Fig. 1.
Figure 3:
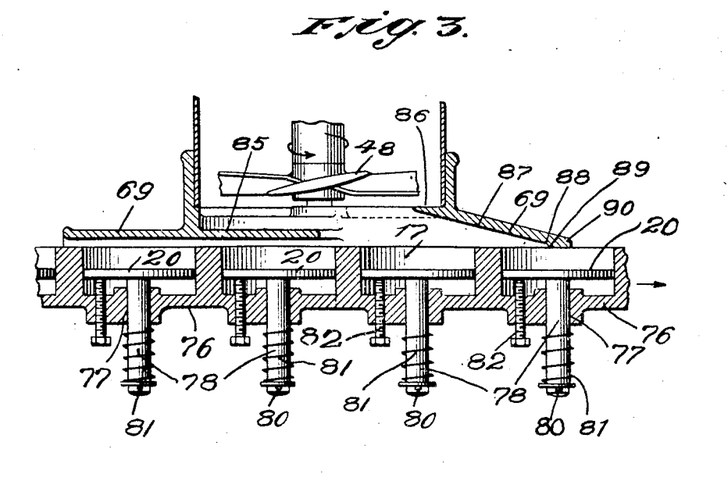
Fig. 3 is a cross-sectional view taken on line 3—3 of Fig. 1.
Figure 4:
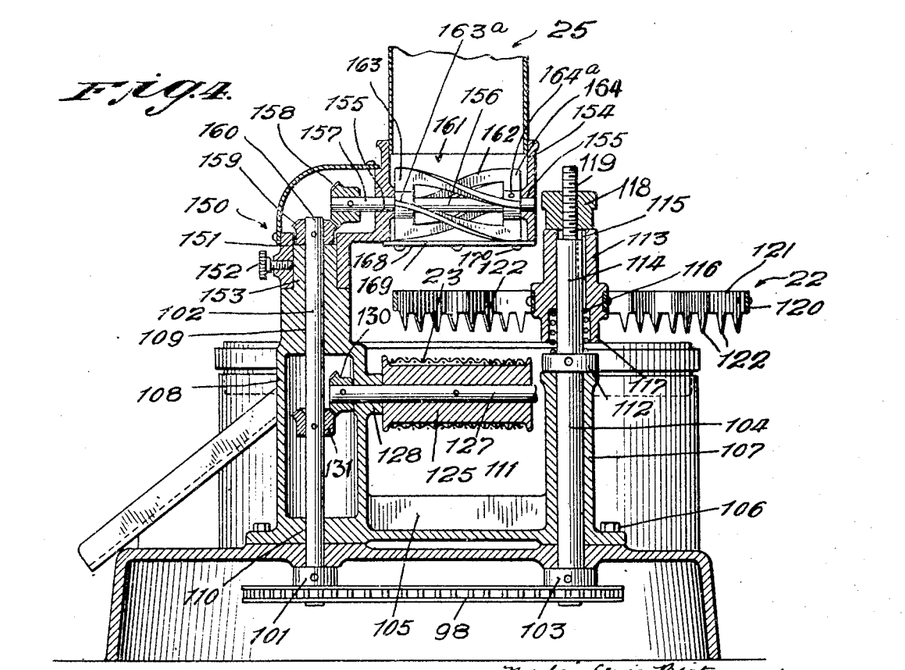
Fig. 4 is a cross-sectional view taken on line 4—4 of Fig. 1.

Said base plate is provided with means for guiding a proper amount of material, of desired consistency into the molds 17 and for removing excess of said material from the molded cakes. To this end the base plate 42 of the hopper is provided with a depressed floor portion 85 adjacent the opening 18. Thus when the blades 48 move counterclockwise as seen in Fig. 1 for the feeding operation, the material will first be pressed down into the depressed portion 85 from where it will be forced into the opening 18. We have found that the provision of the depressed floor portion 85 adjacent the opening 18 results in the production of improved molded cakes of proper consistency, the material on said floor portion being less compact than the material under the blades 48 and on the surface 49 on the base plate 42. The size of said opening 18 is substantially that of a mold opening 17. Thus an excess of food is prevented from accumulating on the surface of plate 16. The food that does pass thru said opening 18 from the floor portion 85 is thus of proper consistency and is substantially the proper amount that can be firmly packed into the molds passing under said opening. Furthermore, once a mold opening 17 has been packed with said material, said mold passes past said opening 18 and the material cannot be forced out of said mold by other material that may be forced thru said opening. The edge 86 of said opening 18, opposite the edge adjacent the depression 85, is raised above the level of surface 49 of the base plate, the arcuate under surface 87 of said plate overlying the path of the mold opening 17 being gradually sloped and terminating in a curved portion 88 having a sharp edge 89. Due to the slope of said surface 87 the food is firmly packed into the mold openings, and all excess is removed by said edge 89. The mold openings 17 passing the edge portion 90 of said extension 69 are thus filled with the formed cakes. (See Fig. 3.)

The camming device 21 for ejecting the formed cakes from the mold openings 17 is adjustably mounted on the support 10 by studs 91 and lock nuts 92. Said cam is mounted underneath the right side of plate 16 and is adapted for coaction with piston rods 78 which ride on said cam after said molds pass said edge portion 90. The formed cake is thus pushed up by pistons or discs 20 until the entire cake is on the top surface of the forming plate. Preferably the extreme rise of said piston is sufficient to raise the upper surface of said piston slightly above the plane of plate 16 to facilitate the removal of the cakes from said plate.

Rotation of said plate 16 is effected by an annular gear 93 secured to said plate by screws 94 and meshing with said gear 41. The plate is thus geared for rotation to the power device 12.

Means is provided for operating said cracker crumb devices 24, 25 the pin disc 22, and the chain 23 by power derived from the motor device 12. To this end the shaft 32 is formed with a reduced extension 95 projecting beneath the casing 30. A sprocket wheel 96 is secured to said extension 95 as by pin 97. Said wheel 96 is belted as by a single sprocket chain 98 to sprocket wheel 99 fixed to a shaft 100 actuating dusting devices 24; to sprocket wheel 101 secured to shaft 102 actuating dusting device 25, and to a sprocket wheel 103 fixed to shaft 104 actuating the pin disc 22. Said shafts 102, 104 are mounted for rotation in a bracket 105 secured to base 10, as by bolts 106, at the side of the plate 16 substantially opposite the hopper. Said bracket comprises an upright bearing portion 107 for mounting said shaft 104 and a vertical housing portion 108 provided with aligned gearings 109, 110 for rotatably mounting said shaft 102. Said housing 108 is spaced from said bearing portion 107 to provide space 111 substantially in alignment with shafts 32 and 66 for receiving one end of said conveying belt 23.

Said pin disc 22 is provided with means for moving the formed cakes ejected by the pistons 20 from the plate 16 to said belt 23. To this end said shaft 104 is provided with a fixed collar 112 abutting the upper end 113 of said bearing for fixing said shaft in proper vertical position. A hub member 113 is splined, as by a key and slot connection 115, to a portion 114 of shaft 104 extending above said collar 112. A coil spring 116 mounted on said shaft 114 is interposed between said ring 112 and said hub member 113. Said hub is preferably provided with a skirted portion 117 for housing the upper end of said spring.

Upward movement of said hub member 113 is limited by a nut 118 secured to the threaded end portion 119 of said shaft 114. A ring 120, is connected to said hub 113 in concentric relation thereto by radial zigzagging or waved spoke members 121 secured to said hub and ring in any suitable manner. Each of said members 121 is provided with downwardly extending teeth or pins 122 adapted to engage the top surface of each cake ejected by the piston 20 and move said cake onto the conveyor belt 23. The rotation of said pin disc 22 is in a counterclockwise direction as viewed in Fig. 1. A slight engagement between the pins 122 and said cakes is sufficient to remove said cakes which are light. Due to the zigzag or waved formation of the spokes 121, a plurality of pins may engage each cake for removing the same.

The belt 23, which is preferably a chain belt, is mounted on pulleys 125, 126. Drive pulley 125 is fixed to a shaft 127 rotatably mounted on one end in a bearing member 128 integrally formed with housing 108. The opposite end of said shaft is mounted in a bearing 129 formed integrally with bearing portion 107. Said shaft 127 is provided with a spur gear 130 meshing with a spur gear 131 fixed on shaft 102. Said pulley 126 is rotatably mounted on a shaft 132 supported at its opposite ends, by a bracket 133, comprising spaced parallel arms 134, 135 connected by a plate 135 extending underneath the belt 23. Said arms 134, 135 are provided with slotted end portions 134a, 135a receiving the reduced threaded ends 134b, 135b respectively of said shaft 132. Nuts 134c, 135c, received on said threaded end portions fix said shaft 132 to said arms 134, 135. Said bracket is provided with means for mounting same on bracket support 105 for angular adjustment therewith. To this end said housing 108 and bearing portion 107 are each provided with similar aligned parallel extension plates 137, each of said plates 137 comprises an ear 138 formed with an opening 139 wherein is mounted a shaft 140 secured to said ear 138 in any suitable manner. Said shaft 140 extends thru openings 141 in said arms 134, 135 for rotatably mounting the same on said extension plates 137. Said plates are formed with curved slots 142 concentric with said openings 139, for receiving outwardly extending screw threaded pins 143. Wing nuts 144 cooperate with said pins 143 and plates 137 for securing said arms 134, 135 in any desired angular position. It will be now apparent that the inclination of the belt 23 may be adjusted by proper manipulation of the wing nuts 144. Any suitable receptacle (not shown) may be placed at the outer end of the belt for receiving the cakes from said belt.

An inclined chute 145 may be positioned beneath the chain belt 23 for catching crumbs or other material falling thru said belt, and guiding said material to a receptacle (not shown). Said chute may be secured to supports 105 and 10 by screws 146 or in any other suitable manner.

The cracker crumb spreaders 24, 25 are identical, the former being positioned over the forming plate 16 to spread crumbs or other food dust on the discs 20 from which the cakes have been removed, while spreader 25 is positioned over the belt 23 to coat the formed cakes which are being conveyed by the plate, with the powdered food. Since the spreaders 24, 25 are similar, the latter only will be described in detail.

Said spreading device 25 comprises a bracket 150 formed with a collar 151 secured, as by set screw 152, to reduced portion 153 extending from said housing 108. A hopper 154 is preferably formed integrally with said collar 151 and extends at an angle thereto. Said hopper is provided with aligned bearing portion 155 journalling a shaft 156, one end 157 whereof extends beyond said hopper. A spur gear 158 secured to said end 157, meshes with a spur gear 159 secured to the upper end 160 of said vertical shaft 102. An agitating member 161 is fixedly mounted in said shaft 156, for rotation within said hopper 154. Said agitating member 161 comprises a plurality of substantially helical blades 162, each terminating in radial arms 163, 164 connected to collars 163a, 164a, respectively, fixed to said shaft 156. The bottom portion 165 of said hopper substantially conforms to the curvature of the cylindrical path of the outer edges 166 of said blades 162. Said bottom portion is formed with a slot 167 to provide an opening for permitting material in said hopper to fall thru.

Means is provided for adjusting the effective width of said opening. To this end, a plate 168 is secured to the undersurface 169 of said hopper, as by screws 170. A second plate 171 is slidably mounted to the undersurface 172 of said hopper as by a pin and slot connection 173. Said plate 171 is provided with an upstanding ledge 174 slidably receiving a screw threaded pin 175 integrally formed with said hopper. A small coil spring 176 is interposed between said hopper and said ledge 174. An adjusting nut 177 secured on said pin 175 is adapted to move the plate 173 inwardly against the pressure of spring 176 to vary the effective width of the opening 167. It will now be apparent that when the machine operates, the shaft 156 will be rotated thru gears 158, 159a and shaft 102. The agitating member 161 is thus rotated to assure a constant, free flowing supply of cracker crumbs or any other powdered food material in the hopper 154. The latter is preferably formed with an inclined wall 180 and a circular upper end portion 181. A container 182 may be mounted on said open end to provide a sufficient supply of said crumbs. Said container may be closed by a cover 183.

Figures 5, 6:
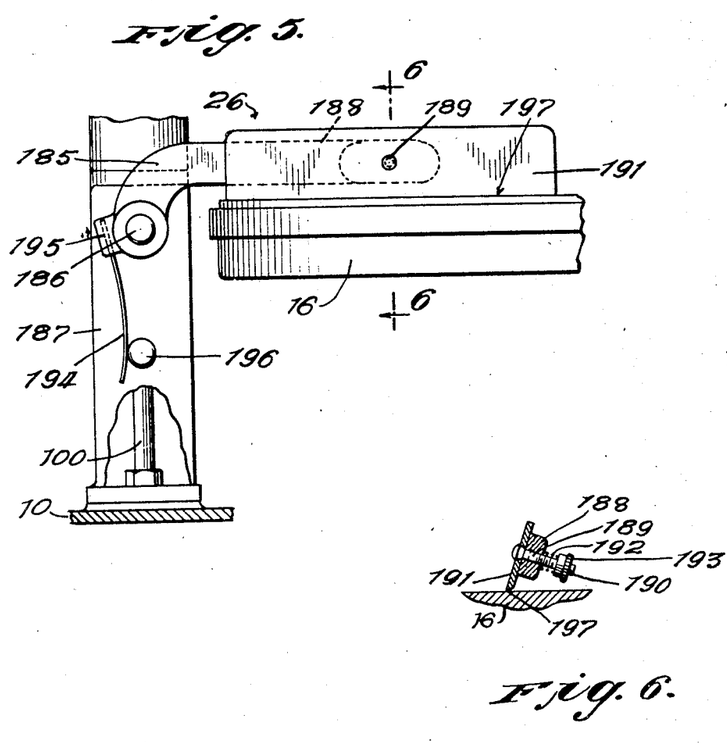
Fig. 5 is an enlarged side view of a detail.
Fig. 6 is a cross-sectional view taken on line 6—6 of Fig. 5.

The device 26 is provided for cleaning the discs 20 from which the cakes have been removed, prior to the application of a new surfacing of powdered material from the spreader 24. Said device comprises an arm 185 rotatably mounted on a stud 186 extending from the casing 187 which houses the vertical shaft 100. Said arm 185 comprises a horizontal portion 188 extending over the plate 16 and formed with an opening 189 adjacent one end thereof. A screw member 190 loosely received in said opening is secured to a blade 191 having a scraping edge 197 yieldingly maintained in contact with said horizontal portion 188 by a compression spring 192 and adjusting nut 193 engaging the threads of said screw. Means is provided for normally pressing said arm 188 and blade 191 down against said plate 16. Said means comprises a blade spring 194 secured at one end to a lug 195 fixed to said arm 185. The free end of said spring 194 bears against a pin 196 projecting from said housing 187. Said pin presses against said spring to urge clockwise rotation of the arm 185, as seen in Fig. 5. The blade 191 is thus yieldingly pressed down on the plate 16 and the ejecting pistons 20 passing thereunder.

It will be noted that the said blade 191 does not extend radially inwardly from the periphery of said forming plate 16. Said blade is set to form such an angle with said periphery that material scraped by said edge 197 will be pushed toward said periphery, by newly scraped material. Means is provided for catching any such material falling off the plate 16. To this end, an inclined chute 200 is secured to base 10 and to housings 108 and 187 as by screws 201. Said chute is located underneath that portion of the periphery of plate 16 from which the material scraped by said blade 191 will fall. Any suitable receptacle (not shown) may be provided for catching the food coming down said chute 200.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings is to be interpreted as illustrative and not in a limiting sense.

Having thus described our invention we claim as new and desire to secure by Letters Patent:

1. A bottom plate for a hopper formed with a flat floor portion, a flat portion depressed below the level of said first mentioned portion and an opening adjacent said depressed portion.

2. A bottom plate for a hopper formed with a flat floor portion, a flat portion depressed below the level of said first mentioned portion and an opening adjacent said depressed portion, the edge of said opening opposite to said depressed portion being raised above the level of said depressed portion.

3. A bottom plate for a hopper formed with a floor portion, a flat portion depressed below the level of said first mentioned portion and an opening adjacent said depressed portion, the edge of said opening opposite to said depressed portion being raised above the level of said depressed portion, the undersurface of said plate adjacent said edge being undercut to form a sloping surface.

4. A bottom plate for a hopper formed with a depressed floor portion and an opening adjacent said depressed portion, the edge of said opening opposite to said depressed portion being raised above the level of said depressed portion, the undersurface of said plate adjacent said edge being undercut to form a sloping surface, said undercut surface terminating in a downwardly curved portion forming a sharp cut-off edge.

5. In a machine of the character described, in combination, a hopper having a bottom plate adapted to receive comminuted material, a mold for said material movable beneath said hopper, said bottom plate being formed with a flat depressed portion, and an opening adjacent said depressed portion, and means within said hopper for feeding said material thru said opening to said molds.

6. In a machine of the character described, in combination, a hopper having a bottom plate adapted to receive comminuted material, a mold for said material movable beneath said hopper, said bottom plate being formed with a depressed portion and an opening adjacent said depressed portion, and means within said hopper for feeding said material thru said opening to said molds, the horizontal cross-sectional area of said opening being substantially equal to that of said mold.

7. In a machine of the character described, in combination, a hopper having a bottom plate adapted to receive comminuted material, a mold for said material movable beneath said hopper, said bottom plate being formed with a depressed portion and an opening adjacent said depressed portion, and means within said hopper for feeding material thru said opening to said molds, the horizontal cross-sectional area of said opening being substantially equal to that of said mold, the undersurface of said plate adjacent said opening being sloped and extending to a point above the upper surface of said plate.

8. In a machine of the character described, in combination with a rotating plate having a plurality of molds therein, means for feeding plastic material to said molds to form cakes, means for ejecting said cakes from said molds and rotating disc means adapted to engage the tops of said cakes for removing said ejected cakes from said plate.

9. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a rotating member having means for engaging the top surface of said cakes.

10. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a member having means for engaging the top surface of said cakes.

11. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a rotating disc having depending pins adapted to engage said cakes.

12. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a horizontal movable zigzag shaped member adapted to engage said cakes.

13. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a movable member provided with a plurality of depending pins for engaging said cakes.

14. In a machine of the character described, in combination with a rotating plate having a plurality of molds therein, means for feeding plastic material to said molds to form cakes, means for ejecting said cakes from said molds, and means for removing said ejected cakes from said plate, said last mentioned means comprising a disc rotatable about a vertical axis, said disc comprising a hub and a ring member, and a plurality of radially extending wave shaped spoke members having cake engaging portions, connecting said hub and ring.

15. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a disc rotatable about a vertical axis, said disc comprising a hub and a ring member, connected to said hub by a plurality of radially extending zigzag shaped spoke members, said members being provided with integral depending pins adapted to engage said cakes.

16. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a disc splined for rotation to a vertical shaft and having yielding, sliding movement therewith, said disc comprising a plurality of zigzag shaped members provided with depending pins for engaging said cakes.

17. In a machine of the character described, in combination, a hopper for receiving plastic material, a molding plate adapted to form cakes from said plastic material in said hopper, a traveling belt mounted adjacent said plate means for moving formed cakes onto said belt, overlying the path of said cakes and adapted to engage the top of said cakes, and means for adjusting the inclination of said belt.

18. In a machine of the character described, in combination with a rotating plate having a plurality of molds therein, means for feeding a plastic material to said molds to form cakes, means for ejecting said cakes from said molds, and a movable member overlying the path of said ejected cakes, said member having means disposed above and spaced from said plate for engaging the top of said cakes for removing the same from said plate.

19. In a machine of the character described, in combination with a rotating plate having a plurality of molds therein, means for feeding plastic material to said molds to form cakes, means for ejecting said cakes from said molds, and means for removing said ejected cakes from said plate, said last mentioned means comprising a rotating member parallel to said plate and having means for engaging the top surface of said ejected cakes.

20. In a machine of the character described, in combination with a rotating plate having a plurality of molds therein, means for feeding plastic material in said molds to feed cakes, means for ejecting said cakes from said molds, and a member mounted for rotation about an axis transverse to said plate and spaced above the same, having means adapted to engage said cakes for removing the same from said plate.

21. In a machine of the character described, in combination with a rotating plate having a plurality of molds therein, means for feeding plastic material in said molds to form cakes, means for ejecting said cakes from said molds, and a member mounted for rotation about an axis transverse to said plate and spaced above the same overlying the path of said ejected cakes, having means adapted to engage said cakes for removing the same from said plate.

22. In a machine of the character described, in combination with a rotating plate having a plurality of molds therein, means for feeding plastic material to said molds to form cakes, means for ejecting said cakes from said molds, and means for removing said ejected cakes from said plate, said last mentioned means comprising a disc mounted for rotation about an axis transverse to said plate and having depending pins adapted to engage said cakes.

23. In a machine of the character described, in combination with a rotating plate having a plurality of molds therein, means for feeding plastic material to said molds to form cakes, means for ejecting said cakes from said molds and means for removing said ejected cakes from said plate, said last mentioned means comprising a member having substantially zigzag shaped portions, said member being mounted for rotation about an axis transverse to the plane of said plate, said portions having means adapted to engage said cakes.

24. In a machine of the character described, in combination with a rotating plate having a plurality of molds therein, means for feeding plastic material to said molds to form cakes, means for ejecting said cakes from said plate, said last mentioned means comprising a member mounted for rotation about an axis transverse to said plate, said member having sinuously-shaped portions provided with a plurality of depending pins for engaging said cakes.

25. In a machine of the character described, in combination with a hopper adapted to receive a plastic material molding plate having a plurality of molds for forming cakes from said plastic material, means for applying powdered coating material to said cakes, and means for scraping said molding plate, said last mentioned means comprising a pivotally mounted member, spring means for normally urging a portion of said member towards said plate, a blade member movably mounted on said portion, and resilient means for normally pressing said plate against said portion.

26. In a machine of the character described, in combination, a hopper having a bottom plate adapted to receive comminuted material, a mold for said material movable beneath said hopper, said bottom plate being formed with a depressed portion, and means within said hopper for feeding material thru said opening to said molds, the undersurface of said plate adjacent said opening being sloped and extending to a point above the upper surface of said plate.

In testimony whereof we affix our signatures.

NICOLAI LEWIS BIGTON.
LOUIS X. GARFUNKEL.